United States Patent
Takeda et al.

(10) Patent No.: US 10,492,230 B2
(45) Date of Patent: Nov. 26, 2019

(54) USER TERMINAL AND METHOD FOR CONTROLLING TRANSMISSION POWER OF A PRACH

(71) Applicant: NTT DOCOMO, INC., Tokyo (JP)

(72) Inventors: Kazuki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/100,382

(22) Filed: Aug. 10, 2018

(65) Prior Publication Data

US 2019/0007975 A1 Jan. 3, 2019

Related U.S. Application Data

(63) Continuation of application No. 15/325,327, filed as application No. PCT/JP2015/069868 on Jul. 10, 2015, now Pat. No. 10,075,982.

(30) Foreign Application Priority Data

Jul. 11, 2014 (JP) .................................. 2014-143220

(51) Int. Cl.
*H04W 74/08* (2009.01)
*H04W 52/50* (2009.01)
(Continued)

(52) U.S. Cl.
CPC ....... *H04W 74/0833* (2013.01); *H04W 28/16* (2013.01); *H04W 52/146* (2013.01);
(Continued)

(58) Field of Classification Search
CPC ............. H04W 74/0833; H04W 52/50; H04W 52/367; H04W 52/146; H04W 28/16;
(Continued)

(56) References Cited

U.S. PATENT DOCUMENTS 9,955,437 B2 * 4/2018 Takeda .................. H04W 16/32
10,075,982 B2 * 9/2018 Takeda .................. H04W 28/16
(Continued)

FOREIGN PATENT DOCUMENTS

WO 2013-047129 A1 4/2013

OTHER PUBLICATIONS

U.S. Appl. No. 62/060,528, PRACH Transmission Handling in LTE, Oct. 6, 2014, USPTO DAV [retrieved on Jun. 10, 2019], pp. 1-11. (Year: 2014).*
(Continued)

*Primary Examiner* — Omar J Ghowrwal
(74) *Attorney, Agent, or Firm* — Osha Liang LLP

(57) ABSTRACT

A user terminal communicates with a plurality of radio base stations that each configure a cell group including one or more cells. The user terminal has a transmission section that transmits UL signals in each cell group, and a control section that controls the transmission power of UL signals. The control section controls the total power of the transmission power of a first PRACH for a master base station and the transmission power of a second PRACH for a secondary base station, which are transmitted at the same time from the transmission section, to be equal to or lower than the maximum possible transmission power, by lowering the transmission power of the second PRACH.

3 Claims, 17 Drawing Sheets

(51) Int. Cl.
  *H04W 52/36* (2009.01)
  *H04W 52/14* (2009.01)
  *H04W 28/16* (2009.01)
  *H04W 72/04* (2009.01)
  *H04W 52/34* (2009.01)
  *H04W 88/08* (2009.01)
  *H04W 88/02* (2009.01)

(52) U.S. Cl.
  CPC ......... *H04W 52/34* (2013.01); *H04W 52/367* (2013.01); *H04W 52/50* (2013.01); *H04W 72/04* (2013.01); *H04W 74/08* (2013.01); *H04W 88/02* (2013.01); *H04W 88/08* (2013.01)

(58) Field of Classification Search
  CPC ..... H04W 74/08; H04W 72/04; H04W 52/34; H04W 88/08; H04W 88/02
  See application file for complete search history.

(56) References Cited

U.S. PATENT DOCUMENTS

| | | |
|---|---|---|
| 2013/0058315 A1 | 3/2013 | Feuersanger et al. |
| 2014/0226551 A1* | 8/2014 | Ouchi .................. H04W 52/04 370/311 |
| 2016/0100434 A1* | 4/2016 | Chen ................. H04W 74/0866 370/329 |
| 2016/0255591 A1 | 9/2016 | Park et al. |
| 2016/0353387 A1* | 12/2016 | Gao .................... H04W 52/146 |

OTHER PUBLICATIONS

International Search Report issued in corresponding application No. PCT/JP2015/069868 dated Sep. 29, 2015 (3 pages).
Written Opinion of the International Searching Authority issued in corresponding application No. PCT/JP2015/069868 dated Sep. 29, 2015 (4 pages).
NTT DOCOMO, "Power-control mechanisms for dual connectivity"; 3GPP TSG RAN WG1 Meeting #77, R1-142264; Seoul, Korea; May 19-23, 2014 (8 pages).
Samsung, "Prioritization of UL Transmissions under Power Limitation"; 3GPP TSG RAN WG1 #77, R1-142103; Seoul, Korea; May 19-23, 2014 (4 pages).
Ericsson, "Further Discussion on UL Power Control in Dual Connectivity"; 3GPP TSG RAN WG1 Meeting #77, R1-142392; Seoul, Korea; May 19-23, 2014 (4 pages).
3GPP TS 36.300 V8.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
Notification of Reasons for Rejection issued in corresponding Japanese application No. JP2014-143220 dated Sep. 15, 2015 (7 pages).
Extended European Search Report issued in counterpart European Patent Application No. 19151845.5, dated Feb. 20, 2019 (10 Pages).
New Postcom; "Discussion on physical layer functionalities for Dual Connectivity"; 3GPP TSG RAN WG1 Meeting #76bis, R1-141372; Shenzhen, China, Mar. 31-Apr. 4, 2014 (3 Pages).
Office Action issued in the counterpart Indian Patent Application No. 201637044335, dated Mar. 31, 2019 (5 pages).

\* cited by examiner

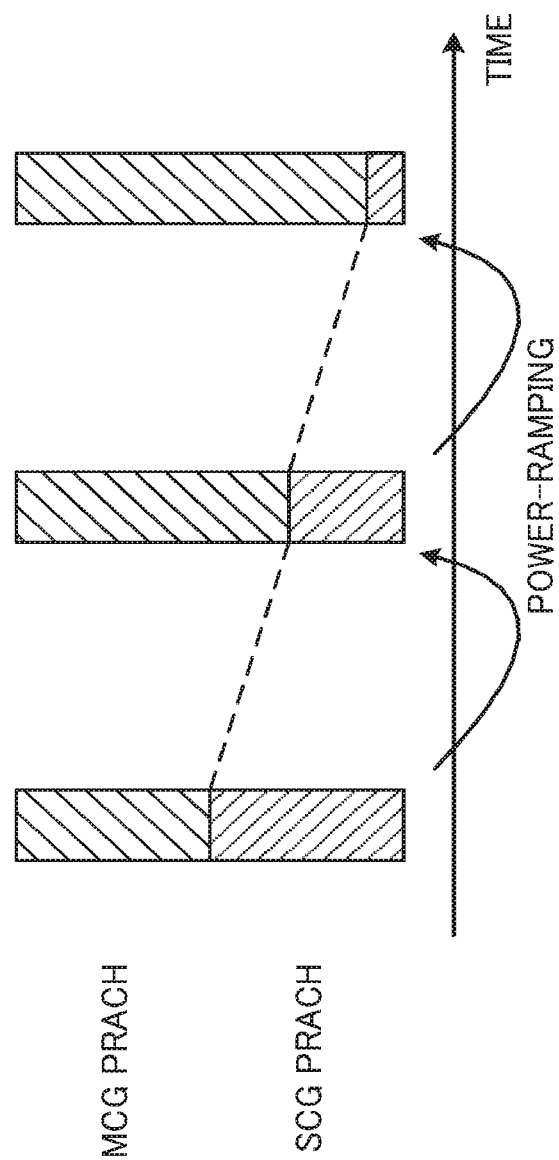

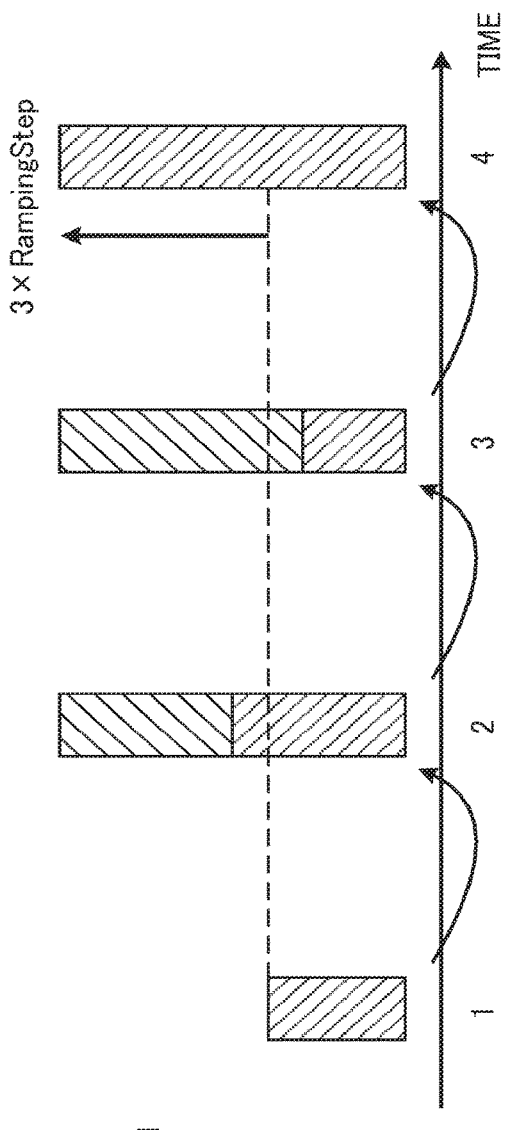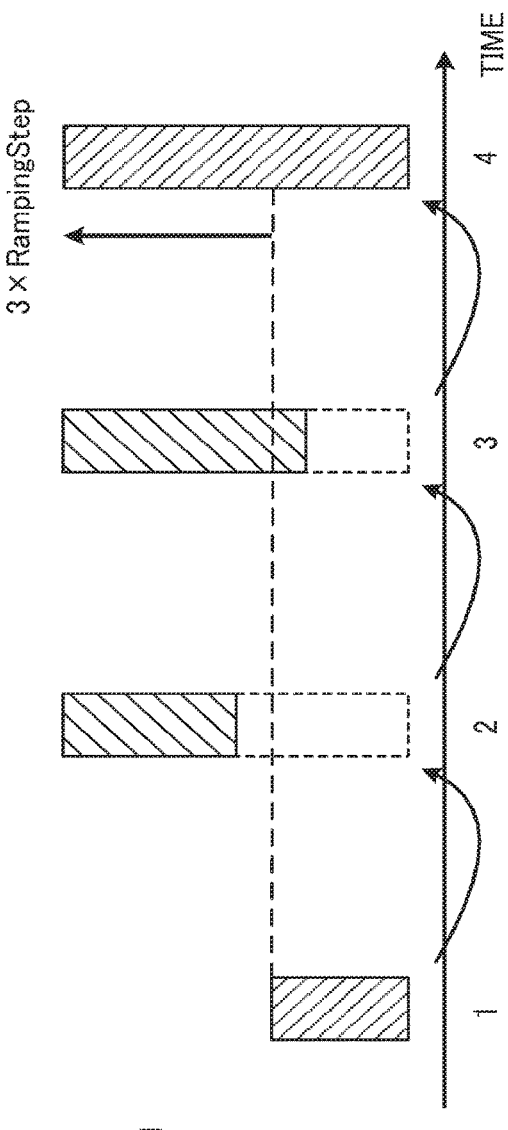

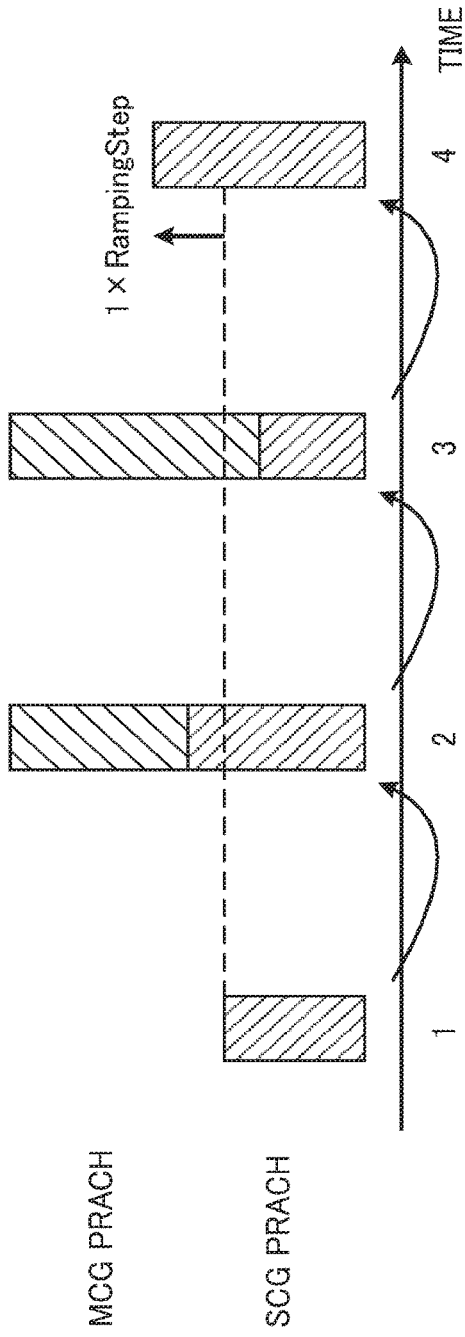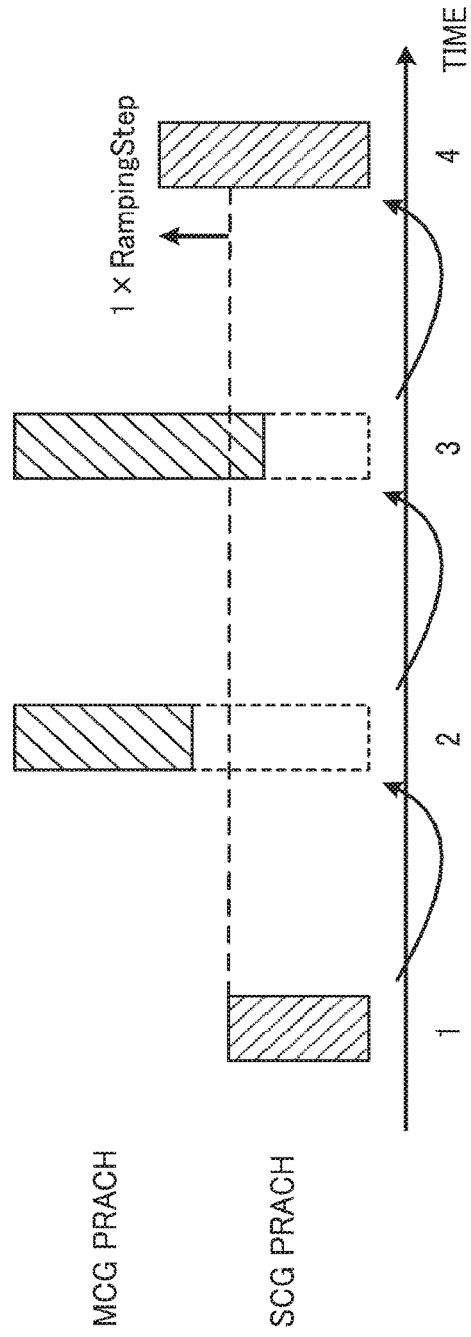

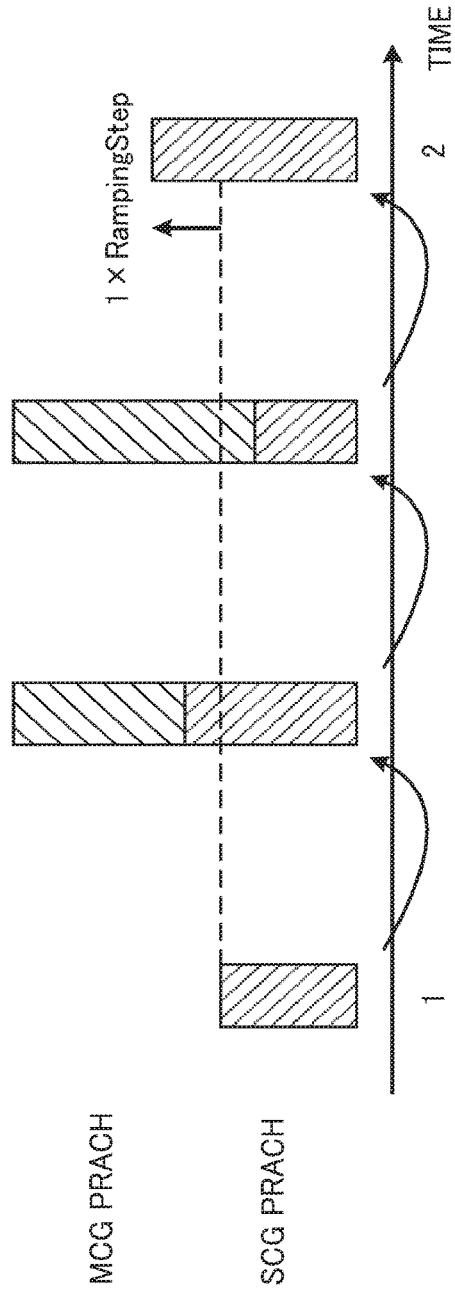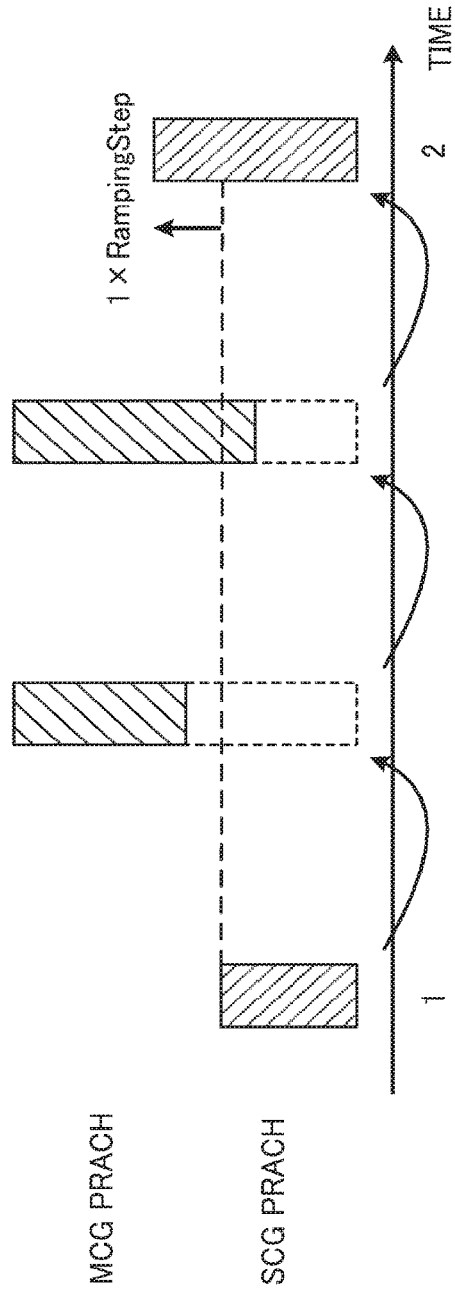

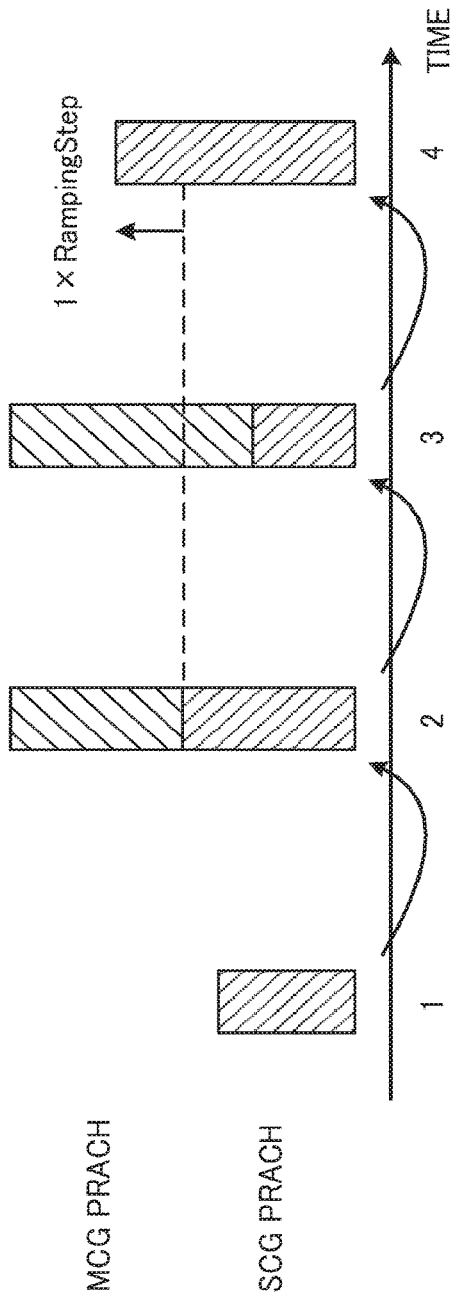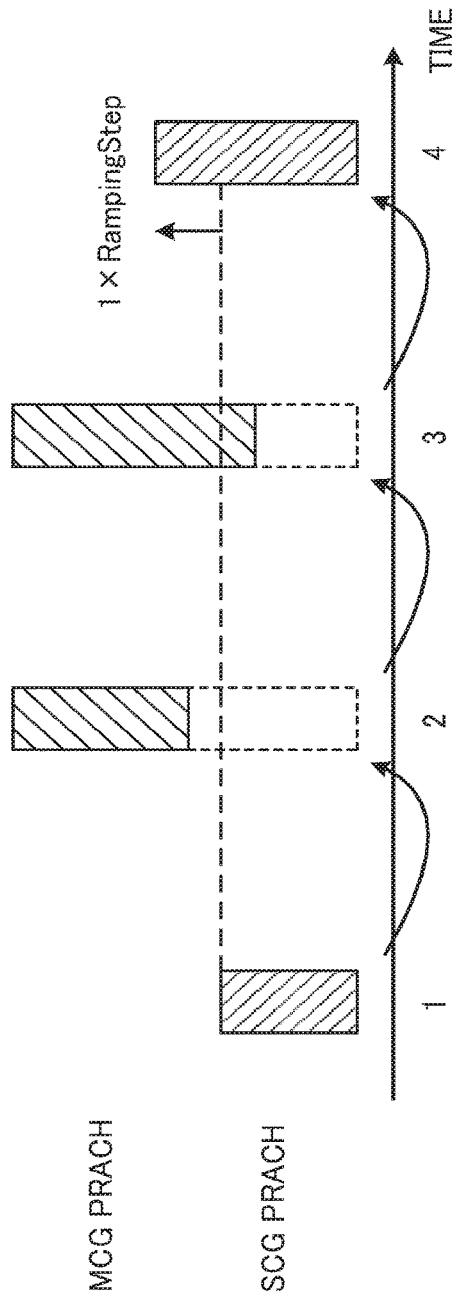

USER TERMINAL AND METHOD FOR CONTROLLING TRANSMISSION POWER OF A PRACH

CROSS REFERENCE TO RELATED APPLICATIONS

This application is a continuation of U.S. patent application Ser. No. 15/325,327 filed on Jan. 10, 2017, which is the U.S. national stage of PCT Application No. PCT/JP2015/069868 filed on Jul. 10, 2015, which claims priority to Japanese Application No. 2014-143220 filed on Jul. 11, 2014. The entire content of these applications is incorporated herein by reference.

TECHNICAL FIELD

The present invention relates to a user terminal, a radio communication method and a radio communication system in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1).

In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Successor systems of LTE—referred to as, for example, "LTE-advanced" or "LTE enhancement" (also referred to as "LTE-A")—have been under study for the purpose of achieving further broadbandization and increased speed beyond LTE, and the specifications thereof have been drafted as LTE Rel. 10/11. The system band of LTE Rel. 10/11 includes at least one component carrier (CC), where the LTE system band constitutes one unit. Such bundling of a plurality of CCs into a wide band is referred to as "carrier aggregation" (CA).

In LTE Rel. 12, which is a more advanced successor system of LTE, various scenarios to use a plurality of cells in different frequency bands (carriers) are under study. When the radio base stations to form a plurality of cells are substantially the same, the above-described CA is applicable. On the other hand, a study in progress to employ dual connectivity (DC) when the cells are formed by completely different radio base stations.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In LTE systems, the physical random access channel (PRACH), which is used when making initial connection, establishing synchronization, resuming communication and so on, holds a high importance. In the event of non-dual connectivity, it does not happen that two or more PRACHs are transmitted at the same time, and allocation of power to PRACHs if of the highest priority.

However, in a radio communication system to use dual connectivity, cases might occur where a plurality of PRACHs are transmitted at the same time. Consequently, unless the transmission power of each PRACH is adequately configured, there is a threat that the throughput of the system deteriorates.

The present invention has been made in view of the above, and it is therefore an object of the present invention to provide a user terminal, a radio communication method and a radio communication system that can reduce the decrease of system throughput in a radio communication system to use dual connectivity.

Solution to Problem

A user terminal according to one aspect of the present invention communicates by using a plurality of cell groups (CGs) including a first CG and a second CG, and this user terminal has a transmission section that transmits a PRACH (Physical Random Access Channel) in each CG, and a control section that controls the transmission power of the PRACH, and, when the total transmission power of PRACHs of the plurality of CGs that are transmitted in an overlapping manner exceeds the maximum possible transmission power, the control section applies control so that transmission power is preferentially allocated to the PRACH of the first CG.

Advantageous Effects of Invention

According to one aspect of the present invention, it becomes possible to reduce the decrease of system throughput in a radio communication system to use dual connectivity.

BRIEF DESCRIPTION OF DRAWINGS

FIG. 5 is a diagram to explain an example of PRACH power ramping according to a first embodiment;

FIGS. 9A-9B provide diagrams, each showing an example of a case of calculating the level of ramp-up by using equation 3, according to the first and third embodiments;

FIGS. 10A-10B provide diagrams, each showing an example of a case of calculating the level of ramp-up by using equation 4, according to the first and third embodiments;

FIGS. 11A-11B provide diagrams, each showing an example of a case of calculating the level of ramp-up by using equation 3 as a variation of equation 4, according to the first and third embodiments;

FIGS. 12A-12B provide diagrams, each showing an example of a case of calculating the level of ramp-up by using equation 5, according to the first and third embodiments;

DESCRIPTION OF EMBODIMENTS

In LTE systems, random access is made by transmitting a physical random access channel (PRACH) on the uplink when establishing initial connection, when establishing synchronization, when resuming communication, and so on. Random access can be classified into two types—namely, contention-based random access (CBRA) and non-contention-based random access (non-CBRA). Note that non-contention-based RA may be also referred to as "contention-free RA" (CFRA).

In contention-based random access, user terminals transmit preambles, which are selected randomly from a plurality of random access preambles (contention preambles) prepared within a cell, by using PRACHs. In this case, there is a possibility that the same random access preamble is used between the user terminals and creates contention.

In non-contention-based random access, user terminals transmit UE-specific random access preambles (dedicated preambles), which are allocated by the network in advance, by using PRACHs. In this case, contention is not created because different random access preambles are allocated between the user terminals.

Contention-based random access is used when establishing initial connection, when starting or resuming uplink communication, and so on. Non-contention-based random access is used when conducting a handover, when starting or resuming downlink communication, and so on.

Figure 1:
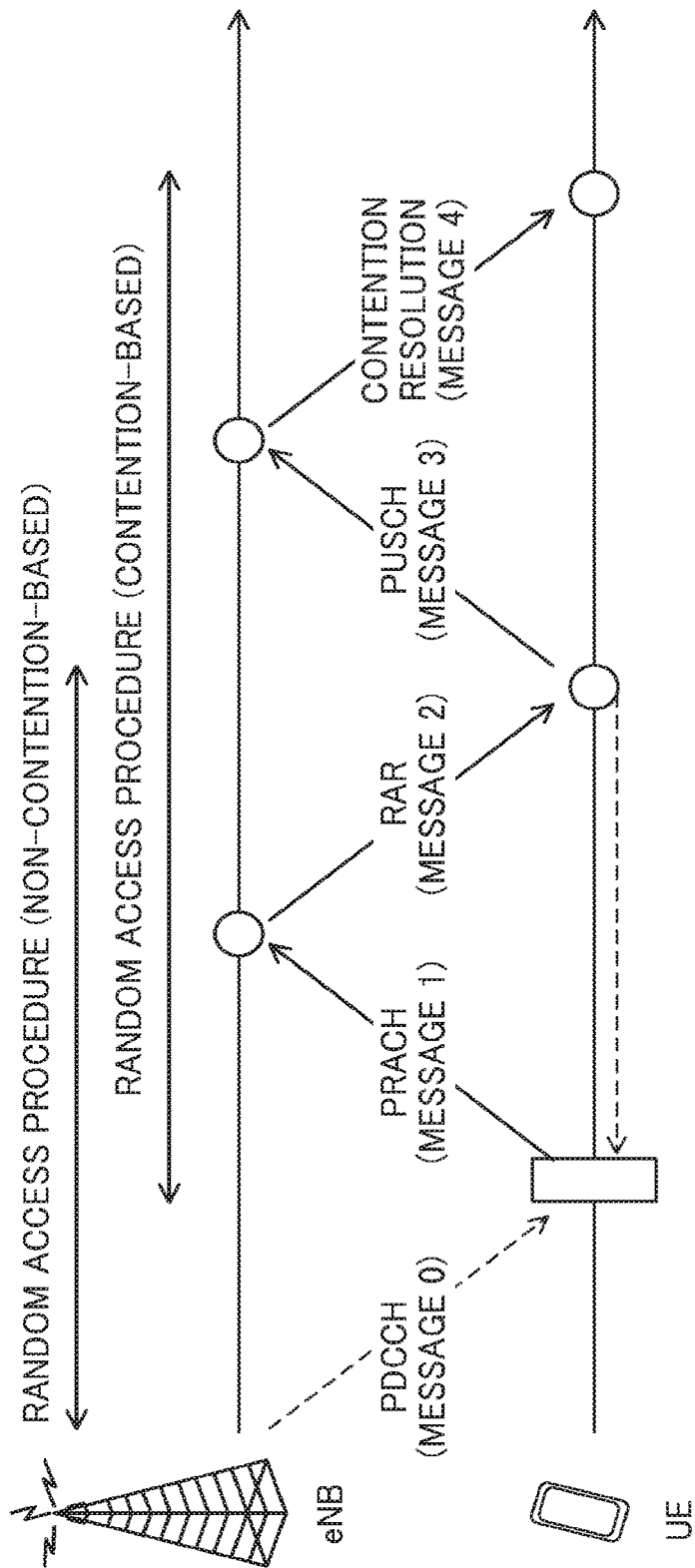
FIG. 1 is a diagram to show an overview of random access.

FIG. 1 shows an overview of random access. Contention-based random access is comprised of step 1 to step 4, and non-contention-based random access is comprised of step 0 to step 2.

In contention-based random access, first, a user terminal UE transmits a random access preamble (PRACH) by using the PRACH resource that is configured in the residing cell (message (Msg) 1). The radio base station eNB, upon detecting the random access preamble, transmits a random access response (RAR) in response (message 2). After having transmitted the random access preamble, the user terminal UE tries to receive message 2 during a predetermined period. When the user terminal UE fails to receive message 2, the user terminal UE raises the transmission power of the PRACH and transmits message 1 again (re-transmission). Note that increasing the transmission power when retransmitting signals is also referred to as "power ramping."

The user terminal UE, when receiving the random access response, transmits a data signal (message 3) by using the physical uplink shared channel (PUSCH) that is specified by an uplink grant included in the random access response. The radio base station eNB, upon receiving message 3, transmits a contention resolution message to the user terminal UE (message 4). The user terminal UE identifies the radio base station eNB by establishing synchronization using messages 1 to 4, and thereupon finishes the contention-based random access procedure and establishes connection.

In the event of non-contention-based random access, first, a radio base station eNB transmits a physical downlink control channel (PDCCH) to command a user terminal UE to transmit a PRACH (message 0). The user terminal UE transmits a random access preamble (PRACH) at the timing specified by the PDCCH (message 1). The radio base station eNB, upon detecting the random access preamble, transmits a random access response (RAR), which is information in response to that (message 2). The user terminal finishes the non-contention-based random access procedure upon receipt of message 2. Note that, as in contention-based random access, when the user terminal fails to receive message 2, the user terminal raises the transmission power of the PRACH and transmits message 1 again.

Note that the transmission of a random access preamble (message 1) to use a PRACH is also referred to as the transmission of a PRACH, and the receipt of a random access response (message 2) using a PRACH is also referred as the receipt of a PRACH.

Now, in LTE-A systems, a HetNet (Heterogeneous Network), in which small cells, each having a local coverage area of a radius of approximately several tens of meters, are formed within a macro cell having a wide coverage area of a radius of approximately several kilometers, is under study. Carrier aggregation and dual connectivity are applicable to HetNet structures.

Figure 2A:
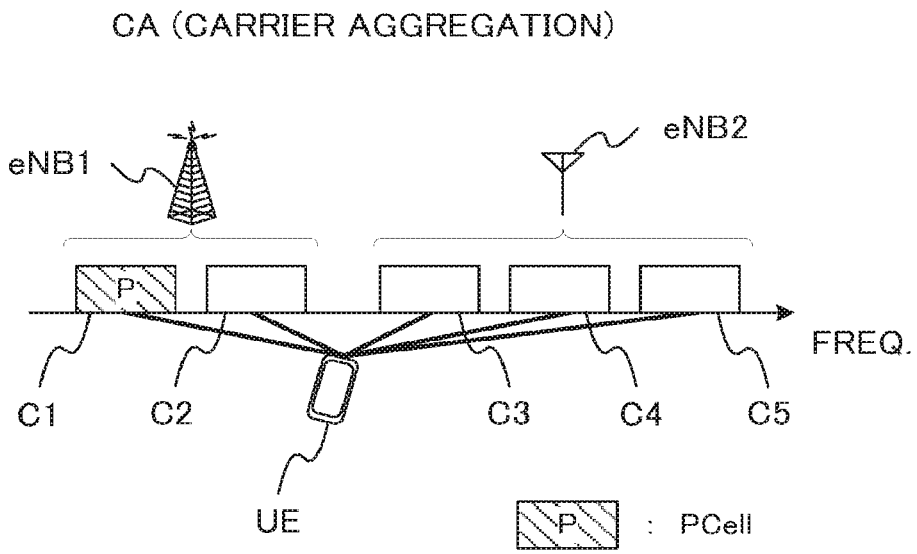
FIGS. 2A-2B provide diagrams to show examples of cell structures in carrier aggregation and dual connectivity.
Figure 2B:
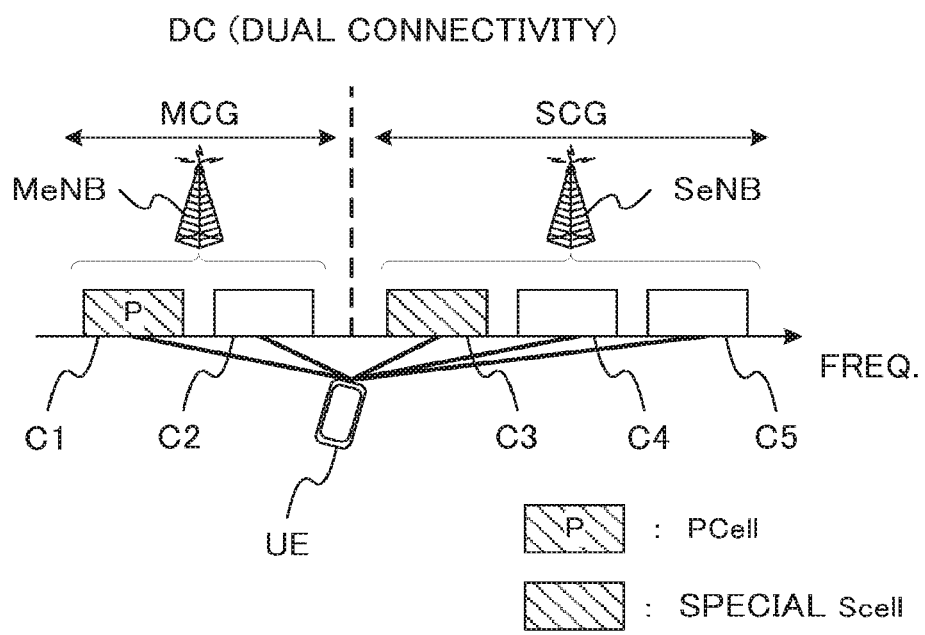

FIGS. 2A-2B provide diagrams to show examples of cell structures in carrier aggregation and dual connectivity. In FIG. 2, the UE is connected with five cells (C1 to C5). C1 is a PCell (Primary Cell), and C2 to C5 are SCells (Secondary Cells).

FIG. 2A shows communication between radio base stations and a user terminal that are engaged in carrier aggregation. In the example shown in FIG. 2A, radio base station eNB1 is a radio base station to form a macro cell (hereinafter referred to as the "macro base station"), and radio base station eNB2 is a radio base station to form a small cell (hereinafter referred to as the "small base station"). For example, the small base station may be structured like an RRH (Remote Radio Head) that connects with the macro base station.

When carrier aggregation is employed, one scheduler (for example, the scheduler provided in macro base station eNB1) controls the scheduling of multiple cells. In the structure in which the scheduler provided in macro base station eNB1 controls the scheduling of multiple cells, each radio base station may be connected by using, for example, an ideal backhaul that provides a high speed channel, such as optical fiber.

FIG. 2B shows communication between radio base stations and a user terminal that are engaged in dual connectivity. When dual connectivity is employed, a plurality of schedulers are provided separately, and these multiple schedulers (for example, the scheduler provided in the radio base station MeNB and the scheduler provided in the radio base station SeNB) each control the scheduling of one or more cells they have control over. In the structure in which the scheduler provided in the radio base station MeNB and the scheduler provided in the radio base station SeNB control the scheduling of one or more cells they each have control over. Each radio base station may be connected by using, for example, a non-ideal backhaul that produces substantial delays, such as the X2 interface.

Referring to FIG. 2B, in dual connectivity, each radio base station configures a cell group (CG) that is comprised of one cell or a plurality of cells. Each cell group is comprised of one or more cells formed by the same radio base station, or one or more cells formed by the same transmission point, which may be a transmitting antenna apparatus, a transmission station and so on.

The cell group that includes the PCell will be hereinafter referred to as the "master cell group" (MCG), and the cell group that is not the master cell group will be hereinafter referred to as the "secondary cell group" (SCG). The total number of cells to constitute the MCG and the SCG is configured to be equal to or less than a predetermined value (for example, five cells).

The radio base station in which the MCG is configured (and which communicates by using the MCG) will be hereinafter referred to as the "master base station" (MeNB: Master eNB), and the radio base station in which the SCG is configured (and which communicates by using the SCG) will be hereinafter referred to as the "secondary base station" (SeNB: Secondary eNB).

Dual connectivity does not presume tight cooperation between radio base stations that is equivalent to that used in carrier aggregation. Consequently, the user terminal executes downlink L1/L2 control (PDCCH/EPDCCH) and uplink L1/L2 control (UCI (Uplink Control Information) feedback through the PUCCH/PUSCH) independently, on a per cell group basis. Consequently, the SeNB, too, needs a special SCell that has equivalent functions to those of the PCell (for example, the common search space, the PUCCH and so on). A special SCell having equivalent functions to those of the PCell will be also referred to as a "PSCell."

Figure 3:
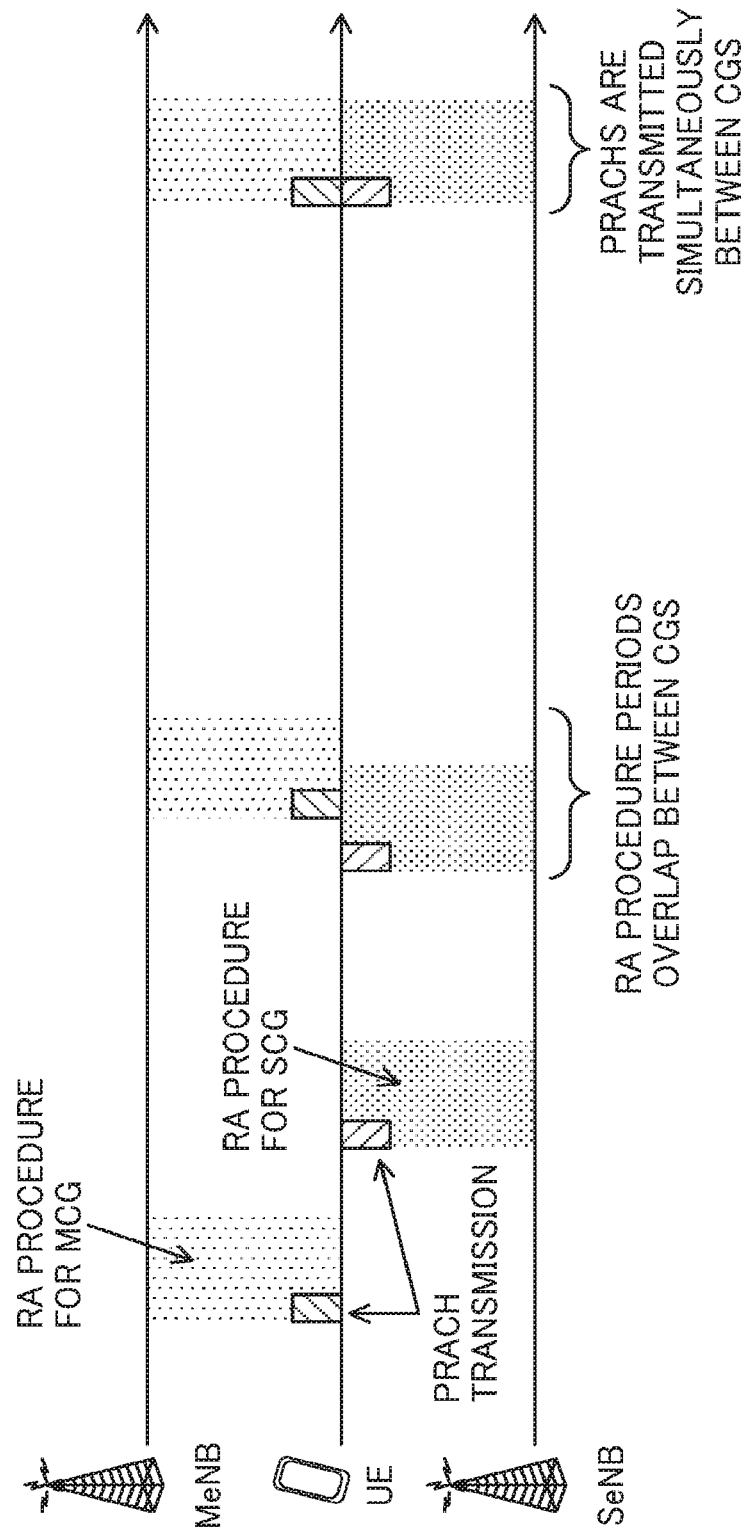
FIG. 3 is a diagram to explain random access in dual connectivity.

Dual connectivity supports random access in both the MCG and the SCG. FIG. 3 is a diagram to explain random access in dual connectivity. As shown in FIG. 3, random access procedure periods are provided in both the MCG and the SCG. The user terminal UE transmits PRACHs in these periods.

In the MCG, the PCell supports both contention-based random access and non-contention-based random access, and SCells of a sTAG (secondary Timing Advance Group) support non-contention-based random access alone. In the SCG, the PSCell supports both contention-based random access and non-contention-based random access, and SCells of an sTAG support non-contention-based random access alone.

Random access can be carried out in parallel in the MCG and in the SCG, as long as the power-limited state is not assumed. For example, as shown in FIG. 3, cell groups may have overlapping random access procedure periods. Also, as shown in FIG. 3, cell groups may transmit PRACHs simultaneously. Furthermore, when PRACHs are transmitted at the same time between cell groups, the period in which these simultaneous transmissions take place is also referred to as a "simultaneous transmission period."

Here, "power-limited" refers to the state in which, at a timing the user terminal attempts transmission, the maximum transmission power is already reached from the perspective of at least one of the serving cell, the TAG, the cell group and this UE. For example, "power-limited" means that the transmission power of uplink signals is limited because uplink signal transmission to exceed the user terminal's maximum possible transmission power is in request. That is, this means that the sum of the transmission power that is needed for uplink signals for the MeNB (MCG) and uplink signals for the SeNB (SCG) exceeds the user terminal's maximum possible transmission power. Here, the transmission power that is needed (also referred to as the "desired power," the "desired transmission power," and so on) includes the power requested from the radio base stations (required transmission power) and the transmission power that is increased by applying power ramping based on the required power.

In dual connectivity, the master base station MeNB and the secondary base station SeNB each control the scheduling independently, and therefore transmission power control to adjust transmission power dynamically within a range in which the total of the user terminal's transmission power for the master base station MeNB and the secondary base station SeNB does not exceed the maximum possible transmission power, is difficult. When the total of transmission power that is needed (also referred to as the "total transmission power," the "sum of transmission power," and so on) exceeds the user terminal's maximum possible transmission power, the user terminal performs the process of scaling down the power (power scaling) or dropping part or all of the channels or the signals (dropping) until the total transmission power to be needed assumes a value not exceeding the maximum possible transmission power. Note that dropping may be carried out by way making the power 0.

Since, in dual connectivity, neither the master base station MeNB nor the secondary base station SeNB is able to know what power control the counterpart radio base station (the secondary base station SeNB for the master base station MeNB and the master base station MeNB for the secondary base station SeNB) is using, there is a fear that the timings and frequency these power scaling and/or dropping may be applied cannot be predicted. When power scaling and/or dropping are applied in a way that is unpredictable to the master base station MeNB and the secondary base station SeNB, uplink communication can no longer be executed properly, which then raises a fear of a significant deterioration of the quality of communication, throughput and so on.

So, dual connectivity introduces the concept of "guaranteed transmission power" (minimum guaranteed power) per cell group, at least to PUCCH/PUSCH transmission. Assume that the guaranteed transmission power for the MCG is $P_{MeNB}$ and the guaranteed transmission power for the SCG is $P_{SeNB}$. The master base station MeNB and the secondary base station SeNB report one or both of the guaranteed transmission power $P_{MeNB}$ and $P_{MeNB}$ to the user terminal through higher layer signaling (for example, RRC signaling). When there is no signaling or command in particular, the user terminal has only to understand that the guaranteed transmission power is: $P_{MeNB}=0$ and/or $P_{SeNB}=0$.

When a transmission request arrives from the master base station MeNB—that is, when PUCCH/PUSCH transmission is triggered by an uplink grant or by RRC signaling—the user terminal calculates the transmission power for the MCG, and, if the power that is required is equal to or lower than the guaranteed transmission power $P_{MeNB}$, determines that this required power is the MCG's transmission power.

When a transmission request arrives from the secondary base station SeNB—that is, when PUCCH/PUSCH transmission is triggered by an uplink grant or by RRC signaling—the user terminal calculates the transmission power for the SCG, and, if the transmission power that is required is equal to or lower than the guaranteed transmission power $P_{SeNB}$, determines that this required power is the SCG's transmission power.

When the required power for a radio base station xeNB (either the master base station MeNB or the secondary base station SeNB) exceeds guaranteed transmission power $P_{xeNB}$ (either the guaranteed transmission power $P_{MeNB}$ or $P_{SeNB}$), the user terminal might control the transmission power to be equal to or lower than the guaranteed transmission power $P_{xeNB}$, depending on conditions. To be more specific, when the total of the required power for the MCG and the SCG shows a threat of exceeding the user terminal's maximum possible transmission power $P_{CMAX}$, the user terminal applies power scaling and/or dropping to part of the channels or signals, with respect to the cell group where the required power exceeds the guaranteed transmission power $P_{xeNB}$. If, as a result of this, the transmission power equals or falls below the guaranteed transmission power $P_{xeNB}$, the user terminal no longer applies power scaling and/or dropping.

That is, at least the guaranteed transmission power $P_{MeNB}$ or $P_{SeNB}$ is guaranteed for the maximum transmission power of the PUCCH/PUSCH in dual connectivity. However, depending on the allocation of other cell groups and the implementation of the user terminal, cases might occur where the guaranteed transmission power $P_{MeNB}$ or $P_{SeNB}$ is not guaranteed for the maximum transmission power of the PUCCH/PUSCH.

Figure 4A:
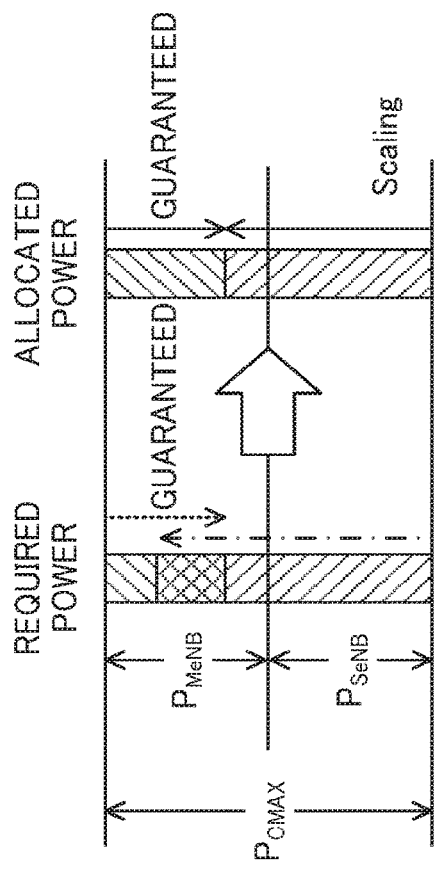
FIGS. 4A-4B provide diagrams to explain transmission power control in dual connectivity.

In the example shown in FIG. 4A, the master base station MeNB requests power that is equal to or lower than the guaranteed transmission power $P_{MeNB}$, and the secondary base station SeNB requests power beyond the guaranteed transmission power $P_{SeNB}$. The user terminal checks whether or not the total sum of the transmission power per CC exceeds the guaranteed transmission power $P_{MeNB}$ and $P_{SeNB}$ in the MCG and in the SCG, and whether or not the total sum of the transmission power of all CCs in both cell groups exceeds the maximum possible transmission power $P_{CMAX}$.

In the example shown in FIG. 4A, the total sum of the transmission power of all CCs in both cell groups exceeds the maximum possible transmission power $P_{CMAX}$, so that the user terminal applies power scaling or dropping. While the total sum of the transmission power of each CC in the MCG does not exceed the guaranteed transmission power $P_{MeNB}$, the total sum of the transmission power of each CC in the SCG exceeds the guaranteed transmission power $P_{SeNB}$, so that the user terminal allocates the required power to the MCG as transmission power, and allocates the rest of the power (the extra power that is left after the MCG's transmission power is subtracted from the maximum possible transmission power $P_{CMAX}$) to the SCG. The user terminal sees this remaining power as the maximum possible transmission power for the SCG, and applies power scaling or dropping to the SCG.

Figure 4B:
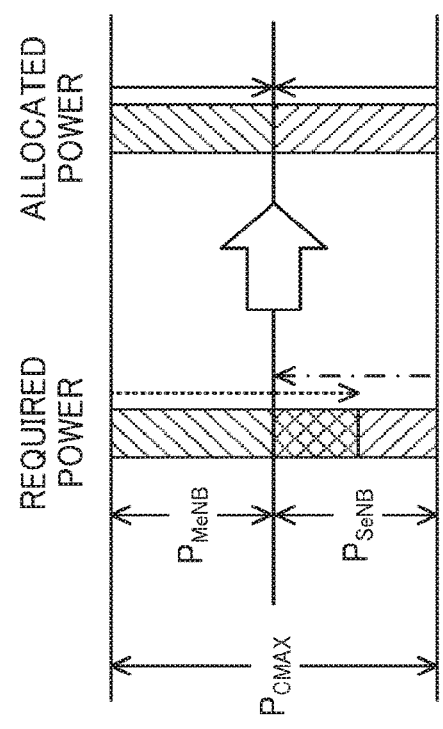

In the example shown in FIG. 4B, power to exceed the guaranteed transmission power $P_{MeNB}$ is requested from the master base station MeNB, and power that is equal to or lower than the guaranteed transmission power $P_{SeNB}$ is requested from the secondary base station SeNB. The total sum of the transmission power of all CCs in both cell groups exceeds the maximum possible transmission power $P_{CMAX}$, so that the user terminal applies power scaling or dropping.

In the example shown in FIG. 4B, while the total sum of the transmission power of each CC in the SCG does not exceed the guaranteed transmission power $P_{SeNB}$, the total sum of the transmission power of each CC in the MCG exceeds the guaranteed transmission power $P_{MeNB}$, so that the user terminal allocates the required power to the SCG as transmission power, and allocates the rest of the power (the extra power that is left after the SCG's transmission power is subtracted from the maximum possible transmission power $P_{CMAX}$) to the MCG. The user terminal sees this remaining power as the maximum possible transmission power for the MCG, and applies power scaling or dropping to the MCG.

As for the rules of power scaling and/or dropping, the rules set forth in Rel. 10/11 can be applied. In Rel. 10/11, simultaneous transmissions in a plurality of CCs might take place during CA, so that the rules of power scaling and/or dropping for when the required transmission power of all CCs exceeds the maximum possible transmission power per user terminal, $P_{CMAX}$. By using the above-noted remaining power (the extra power that is left after the MCG's transmission power is subtracted from the maximum possible transmission power $P_{CMAX}$) as the maximum possible transmission power and the transmission power that is requested in this cell group as the required transmission power, it is possible to apply power scaling and/or dropping to this cell group based on the rules set forth in Rel. 10/11. These can be made possible with mechanisms that have been set forth heretofore, so that the user terminal can easily realize transmission power control and the rules of power scaling and/or dropping by re-cycling existing mechanisms, without introducing new mechanisms.

In LTE systems, the PRACH is used to establish initial connection, to establish synchronization, to resume communication, and so on, so that it is important to realize the transmission and receipt of the PRACH with high quality. In non-dual connectivity (non-DC), the maximum transmission power of the PRACH is the maximum transmission power per CC, $P_{CMAX,c}$. Also, there is a rule to allocate transmission power to the PRACH with the highest priority if the PRACH is going to be transmitted simultaneously with the PUCCH, the PUSCH or the SRS (Sounding Reference Signal) while carrier aggregation is employed.

Also, when the PRACH and the PUCCH/PUSCH are going to be transmitted at the same time and the transmission power exceeds the maximum possible transmission power $P_{CMAX}$, power scaling is applied to the transmission power of the PUCCH/PUSCH until the actual transmission power assumes a value that does not exceed $P_{CMAX}$. Also, when the PRACH and the SRS are going to be transmitted at the same time and the transmission power exceeds the maximum possible transmission power $P_{CMAX}$, the SRS is dropped so that the actual transmission power does not exceed $P_{CMAX}$.

In this way, in non-dual connectivity, it does not occur that two or more PRACHs are transmitted at the same time, and the allocation of power to the PRACH is of the highest priority. However, in a radio communication system to use dual connectivity, cases might occur where a plurality of CGs transmit PRACHs simultaneously. In this case, presently, there are no rules as to how to determine the maximum transmission power of each CG's PRACH. Also, there are no priority rules as to which CG should be allocated transmission power preferentially, either. Consequently, unless the transmission power of the PRACH is adequately configured, there is a threat that the throughput of the system might deteriorate.

So, the present inventors have focused on the fact that, when a radio link failure (RLF) occurs in the MeNB, it is necessary to re-establish the cell connection, and the system throughput deteriorates significantly. Furthermore, the present inventors have focused on the fact that an RLF is highly likely to occur in the MeNB if the PRACH is transmitted to the MeNB with insufficient power. The present inventors have focused on the above points and come up with the idea of preferentially allocating transmission power to the PRACH to transmit to the MeNB in a period in which PRACHs are transmitted simultaneously, in a radio communication system to use dual connectivity. Also, as for the power ramping upon PRACH retransmission, the present inventors have come up with the idea of preferentially applying power control to the MeNB, and arrived at the present invention.

According to the present invention, it is possible to reduce the occurrence of RLFs in the MeNB, so that it is possible to reduce the delay due to cell re-connection. As a result of this, it becomes possible to reduce the decrease of system throughput.

Now, embodiments of the present invention will be described below in detail with reference to the accompanying drawings. Note that, although cases will be shown in the following description in which one MCG and one SCG are configured, the embodiments are by no means limited to this.

(Power Control Upon Simultaneous PRACH Transmissions)

When the power-limited state is created due to simultaneous PRACH transmissions between different CGs (when a UE is detected to be power-limited due to simultaneous PRACH transmissions), control is applied, by using one of the following embodiments (the first to the third embodiments), so that the total of the transmission power of all CGs does not exceed $P_{CMAX}$ in any simultaneous transmission period.

According to the first embodiment, power scaling is applied to the PRACH of the SCG. That is, the transmission power of the PRACH of the MCG is determined and granted as in Rel. 11, and, for the transmission power of the PRACH of the SCG, what is left after the transmission power of the PRACH of the MCG is subtracted from $P_{CMAX}$ is granted.

According to the second embodiment, power scaling is applied to the PRACHs of both CGs. For example, a coefficient W to fulfill following equation 1 is determined, and, using this W, power scaling is applied to the PRACHs of both CGs. That is, the transmission power of the PRACH of the MCG and the transmission power of the PRACH of the SCG are lowered by the same proportion.

$$W \times P_{MCG\_PRACH} + W \times P_{SCG\_PRACH} \leq P_{CMAX} \quad \text{(Equation 1)}$$

Here, $P_{MCG\_PRACH}$ is the desired power of the PRACH of the MCG, and $P_{SCG\_PRACH}$ is the desired power of the PRACH of the SCG.

Alternatively, the PRACHs of both CGs are power-scaled to two predetermined values ($P_{pre\_MCG\_PRACH}$ and $P_{pre\_SCG\_PRACH}$), which are configured in advance to fulfill following equation 2. These two predetermined values ($P_{pre\_MCG\_PRACH}$ and $P_{pre\_SCG\_PRACH}$) may be provided in advance, or may be reported to the user terminal in higher layer signaling such as system information blocks, RRC and so on.

$$P_{pre\_MCG\_PRACH} + P_{pre\_SCG\_PRACH} \leq P_{CMAX} \quad \text{(Equation 2)}$$

According to the third embodiment, the PRACH of the SCG is dropped. In this case, the UE does not transmit the PRACH of the SCG. Note that the allocation of power to the MCG PRACH may be executed as heretofore up to Rel. 11, or may be executed following other rules.

As described above, in each embodiment, control is applied so that the MCG PRACH is prioritized over the SCG PRACH, and allocated power that is at least equal to or greater than that of the SCG PRACH.

(Power Ramping of PRACH of Each CG)

Figure 6:
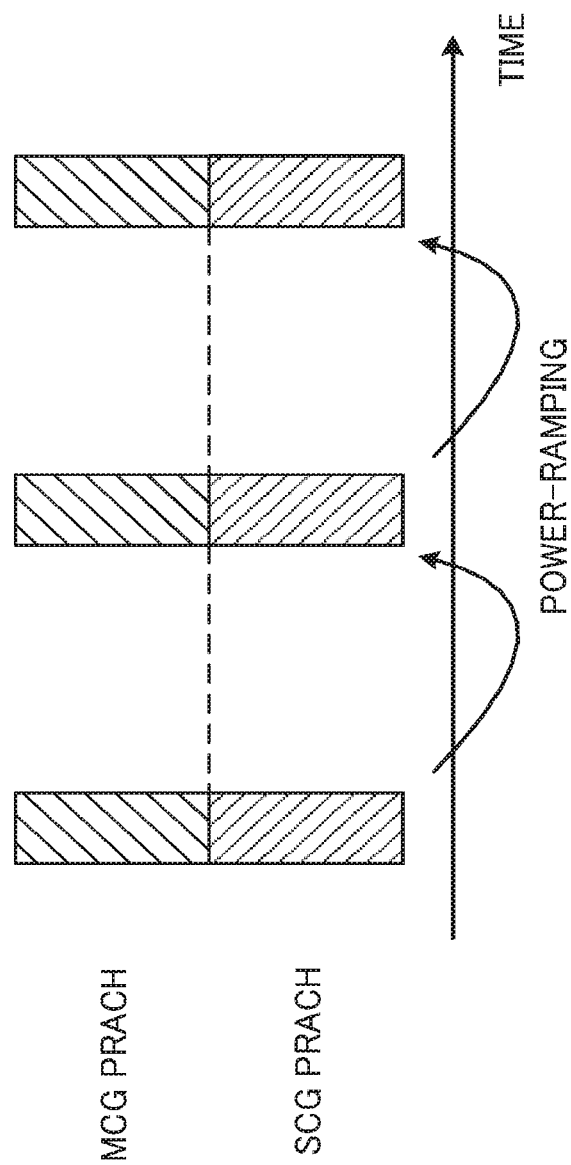
FIG. 6 is a diagram to explain an example of PRACH power ramping according to a second embodiment.
Figure 7:
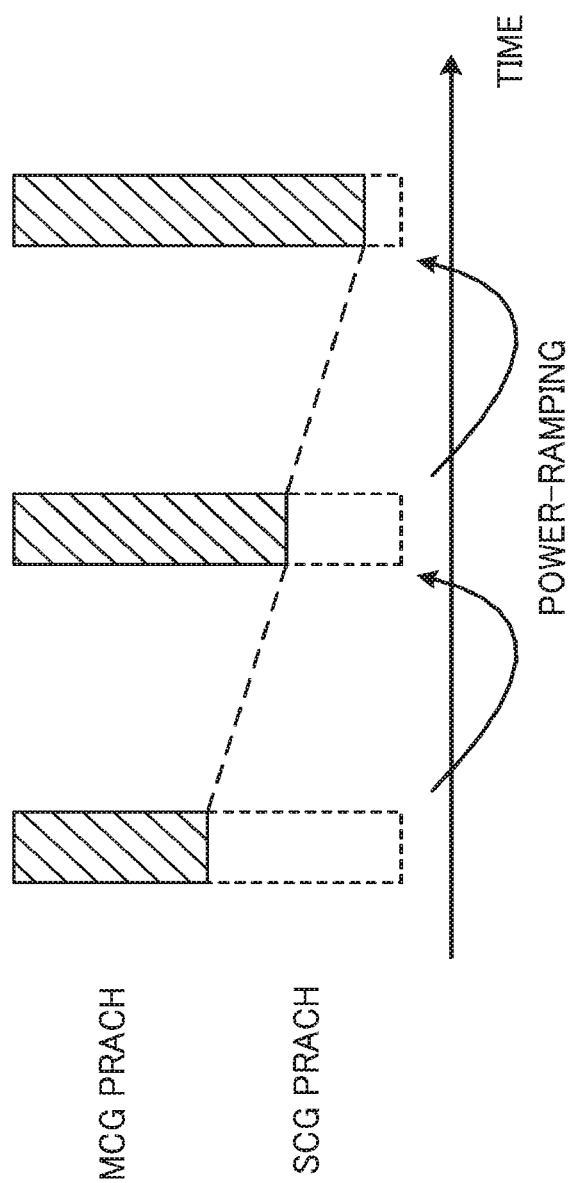
FIG. 7 is a diagram to explain an example of PRACH power ramping according to a third embodiment.

Next in accordance with each embodiment, cases will be described, with reference to FIG. 5 to FIG. 7, where a RAR (Msg2) is not received after the UE transmits a PRACH (Msg1). In this case, the UE retransmits the PRACH by applying power ramping. FIG. 5 to FIG. 7 provide diagrams to explain examples of PRACH power ramping according to the first, second and third embodiments, respectively. Each diagram shows an example where retransmission is carried out twice (that is, transmission is attempted three times).

According to the first embodiment, the power ramping of the PRACH of the MCG is carried out in the same way as when the PRACH of the MCG is transmitted alone. On the other hand, the power ramping for the PRACH of the SCG is limited by taking into account the PRACH of the MCG (for example, not executed until the PRACH of the MCG is no longer retransmitted).

According to the second embodiment, since both PRACHs are already power-limited, power ramping cannot be applied. That is, both PRACHs—the PRACH of the MCG and the PRACH of the SCG—are retransmitted with the same power as in the previous transmission (without power ramping).

According to the third embodiment (in which the PRACH of the SCG is dropped), as in the first embodiment, the power ramping of the PRACH of the MCG is carried out in the same way as when the PRACH of the MCG is transmitted alone. On the other hand, the PRACH of the SCG is not transmitted until the PRACH of the MCG is no longer retransmitted.

As described above, according to the first embodiment, the power allocation/power ramping of the MCG PRACH is carried out as heretofore up to Rel. 11, so that it is possible to maintain an adequate coverage for the MCG PRACH. Furthermore, according to the second embodiment, the power of the SCG PRACH can be kept at a certain level, so that it is possible to raise the random access success rate in the SCG, and reduce the connection delay with the SCG.

Also, according to the third embodiment, the power allocation/power ramping of the MCG PRACH is carried out as heretofore up to Rel. 11, so that it is possible to maintain an adequate coverage for the MCG PRACH. Furthermore, it is possible to avoid launching the PRACH in an inefficient way in the SCG by using inadequate power (for example, too little power), and reduce the increase of power consumption.

Figure 8:
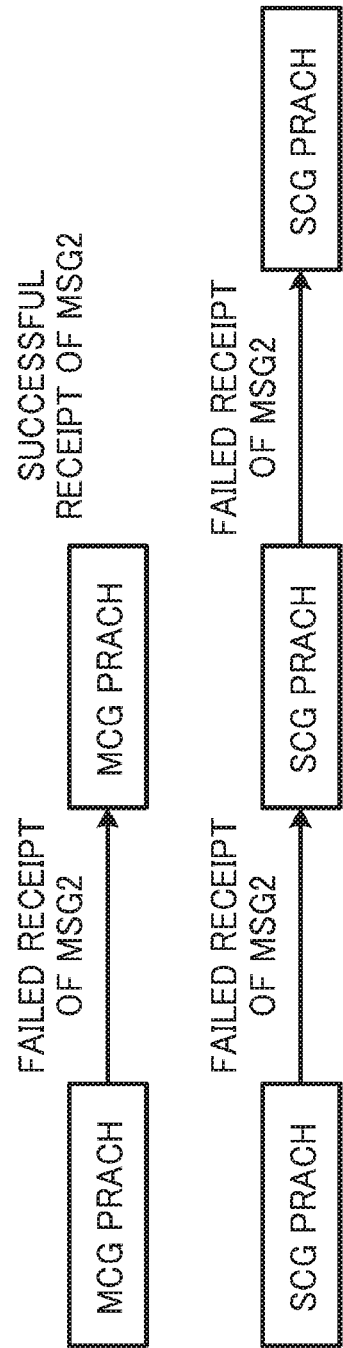
FIG. 8 is a diagram to explain examples of PRACH retransmissions according to each embodiment.

Note that, in any of the embodiments, as soon as Msg2 is successfully received in one CG, the other CG is able to retransmit the PRACH by applying adequate power ramping. FIG. 8 is a diagram to show examples of PRACH retransmissions according to each embodiment. In these examples, while both CGs fail to receive Msg2 in response to the first PRACH transmission from both CGs, in response to the second PRACH transmission from both CGs, the MCG succeeds to receive Msg2 and the SCG fails to receive Msg2. Then, the SCG transmits the PRACH for a third time.

According to the above embodiments, when, upon retransmission, the MCG and the SCG carry out simultaneous transmissions, the SCG is unable to use power ramping, and therefore power ramping cannot be applied to the second PRACH transmission from the SCG in FIG. 8. On the other hand, the third PRACH transmission from the SCG in FIG. 8 is an independent transmission by the SCG, so that power ramping can be applied.

(Level of Ramp-Up in Power Ramping of PRACH of Each CG)

Next, the level of ramp-up in PRACH power ramping according to each embodiment will be described. The level (amount) of ramp-up refers to the increase in desired power based on the initial transmission power (for example, the power required from a radio base station). To be more specific, the level of ramp-up that is calculated using one of following equations 3 to 5 will be applied here.

Level of ramp-up=(the number of attempts of the PRACH−1)×ramping step    (Equation 3)

Level of ramp-up=(the number of attempts of the PRACH−1−the number of attempts of the PRACH resulted in the power-limited state due to simultaneous transmissions)×ramping step    (Equation 4)

Level of ramp-up=the maximum transmission power of earlier PRACHs−the initial PRACH transmission power+ramping step    (Equation 5)

Here, the ramping step represents the increase in the level of ramp-up when the number of times the PRACH transmission is attempted (the number of retransmissions) increases by 1. Note that "(the number of attempts of the PRACH−1)" in equations 3 to 5 may be replaced with the number of times the PRACH is retransmitted. Furthermore, although the assumption holds that these equations are used in the power ramping to apply to the SCG, this is by no means limiting. For example, it is possible to execute power ramping by applying these equations to the MCG.

According to equation 3, the level of ramp-up is determined based on the number of times PRACH transmission is attempted. Consequently, when simultaneous transmissions of PRACHs are over and PRACHs start being transmitted individually, the transmissions can be made with sufficient power, and, furthermore, can be carried out in the same operation as that of existing UEs, so that it is possible to reduce the increase of the cost of implementing user terminals.

According to equation 4, the level of ramp-up is determined based on the number of attempts of solo PRACH transmission. Consequently, when simultaneous transmissions of PRACHs are over and PRACHs start being transmitted individually, it is possible to avoid transmitting the PRACHs with power that is more than necessary and causing extra interference against other cells.

According to equation 5, the level of ramp-up is determined based on the maximum transmission power in the PRACH transmission attempt. That is, the ramped-up PRACH transmission power is equivalent to the maximum transmission power of earlier PRACHs+ramping step.

Consequently, ramping can be applied based on the maximum PRACH power corresponding to Msg2 that has not been received properly earlier, so that PRACH retransmission with adequate ramp up can be realized. Note that "earlier PRACHs" in an ongoing PRACH retransmission refer to the PRACHs that have been transmitted earlier.

To be more specific, examples where equations 3 to 5 are applied to the above embodiments will be described with reference to FIGS. 9A-12B. FIGS. 9A-12B provide diagrams to explain examples of the level of ramp-up in power ramping of PRACHs according to the first and third embodiments. Each FIG. A corresponds to the first embodiment, and each FIG. B corresponds to the third embodiment.

Also, each diagram shows an example, in which attempts are made four times to transmit the SCG PRACH, and in which, in the second and third attempts, the SCG PRACH is transmitted simultaneously with the MCG PRACH. Consequently, although the desired power increases based on ramp-up in the second and third attempts on the SCG PRACH, the MCG PRACH is also ramped up. so that, as a result, the transmission power of the SCG PRACH becomes lower than the desired power.

Now, the level of ramp-up upon the fourth attempt on the SCG PRACH using above equations 3 to 5 will be described below. Note that, unless specified otherwise, the number of attempts on the PRACH is counted by including PRACHs that are dropped upon simultaneous transmissions.

FIGS. 9A-9B provide diagrams to show examples of calculating the level of ramp-up by using equation 3, according to the first and third embodiments. In these examples, the number of attempts of the PRACH is four, and therefore the level of ramp-up is "3×ramping step."

FIGS. 10A-10B provide diagrams to show examples of calculating the level of ramp-up by using equation 4, according to the first and third embodiments. In these examples, the number of attempts of the PRACH is four and the number of attempts of the PRACH that resulted in the power-limited state due to simultaneous transmissions is two, and therefore the level of ramp-up is "1×ramping step."

Note that equation 4 can be realized by not counting the PRACHs that are power-limited due to simultaneous transmissions in the number of times attempts are made on the PRACH in equation 3. FIGS. 11A-11B provide diagrams to show examples of calculating the level of ramp-up by using equation 3 as a variation of equation 4 according to the first and third embodiments. In these examples, the number of times attempts are made on the PRACH is two, and therefore the level of ramp-up is "1×ramping step."

FIGS. 12A-12B provide diagrams to show examples of calculating the level of ramp-up by using equation 5 according to the first and third embodiments. In the example of FIG. 12A, the past maximum PRACH transmission power that applies to the ongoing attempt on the PRACH is the PRACH transmission power of when the number of attempts was two. Consequently, the transmission power upon the fourth attempt on the SCG PRACH is the transmission power upon the second attempt+ramping step. In the example of FIG. 12B, the past maximum PRACH transmission power that applies to the ongoing attempt on the PRACH is the PRACH transmission power of when the number of attempts was one. Consequently, the transmission power upon the fourth attempt on the SCG PRACH is the transmission power upon the first attempt+ramping step. Note that, according to the second embodiment, too, the level of ramp-up can be determined by using equations 3 to 5. For example, in accordance with the second embodiment, when PRACHs are simultaneously transmitted three times in a row and the third MCG PRACH succeeds, as shown in FIG. 6, in the fourth attempt on the SCG PRACH, the SCG PRACH can use equation 3 and employ "3×ramping step" as the level of ramp-up.

Also, after retransmissions are made by using the level of ramp-up based on above-noted equations 3 to 5, if additional retransmission is required, the level of ramp-up may be calculated by using the same equation or may be calculated by using different equations. For example, if additional retransmission is to be made after retransmission in accordance with equation 5, it is possible to use equation 5 likewise and employ power that is given by adding a ramping step to the maximum transmission power of earlier PRACHs.

(Transmission Power of Msg3 and Later)

In each above-described embodiment, after the PRACH is received properly, Msg3 needs to be transmitted using the PUSCH, following the random access procedure. That is, even if the PRACH can be communicated, unless communication continues after this, the result is that random access cannot be finished properly.

So, when the power-limited state is assumed due to simultaneous PRACH transmissions and one of the above first to third embodiments is applied, the transmission power of and after Msg3 (PUSCH) is determined based on the PRACH transmission power of when Msg2 (RAR) was received properly, and the PUSCH TPC command included in the RAR. That is, in a predetermined period after a response (RAR) is received in response to the PRACH, the transmission power of UL signals in the CG having transmitted this PRACH is determined based on transmission power that corresponds to this PRACH. For example, based on the transmission power of the MCG (SCG) PRACH that corresponds to a RAR that is properly received in the MCG (SCG), the transmission power of the MCG (SCG) PUSCH may be determined.

Furthermore, when the power-limited state is assumed due to simultaneous PRACH transmissions and transmission power is preferentially allocated to the MCG PRACH (that is, the first or the third embodiment), control may be applied so that the MCG's UL transmission is prioritized in predetermined periods that come later. In this case, the MCG's transmission power is determined based on PRACH transmission power that corresponds to a RAR that is received properly in the MCG, and this power is preferentially allocated to the MCG's UL transmission. Here, the above-noted predetermined periods may be the following periods:
(1) When a RAR is properly received and a predetermined timer that is provided in the UE starts, the period until this timer expires;
(2) In the event of a contention-based RACH, the period after Msg 4 is received, and until an ACK in response to this Msg4 is transmitted; and
(3) In the event of non-contention-based (contention-free) RACH, the period after Msg2 is received, and until an ACK in response to this Msg2 is transmitted.

By using these periods in a limited manner, it becomes possible to adequately control the UL transmission power until the random access procedure is finished, and, furthermore, if UL transmission power control is to be executed additionally after random access, it is possible to avoid blocking this control.

For example, for the UL transmission power control after random access, guaranteed transmission power (minimum guaranteed power) per radio base station or per CG may be used. In this case, the UL transmission power for the MCG may be controlled to be equal to or lower than the MCG's guaranteed transmission power ($P_{MeNB}$), and the UL transmission power for the SCG may be controlled to be equal to or lower than the SCG's guaranteed transmission power ($P_{SeNB}$).

(Structure of Radio Communication System)

Now, the structure of the radio communication system according to an embodiment of the present invention will be described below. In this radio communication system, a radio communication method to use the PRACH transmission power control according to each above-described embodiment is used.

Figure 13:
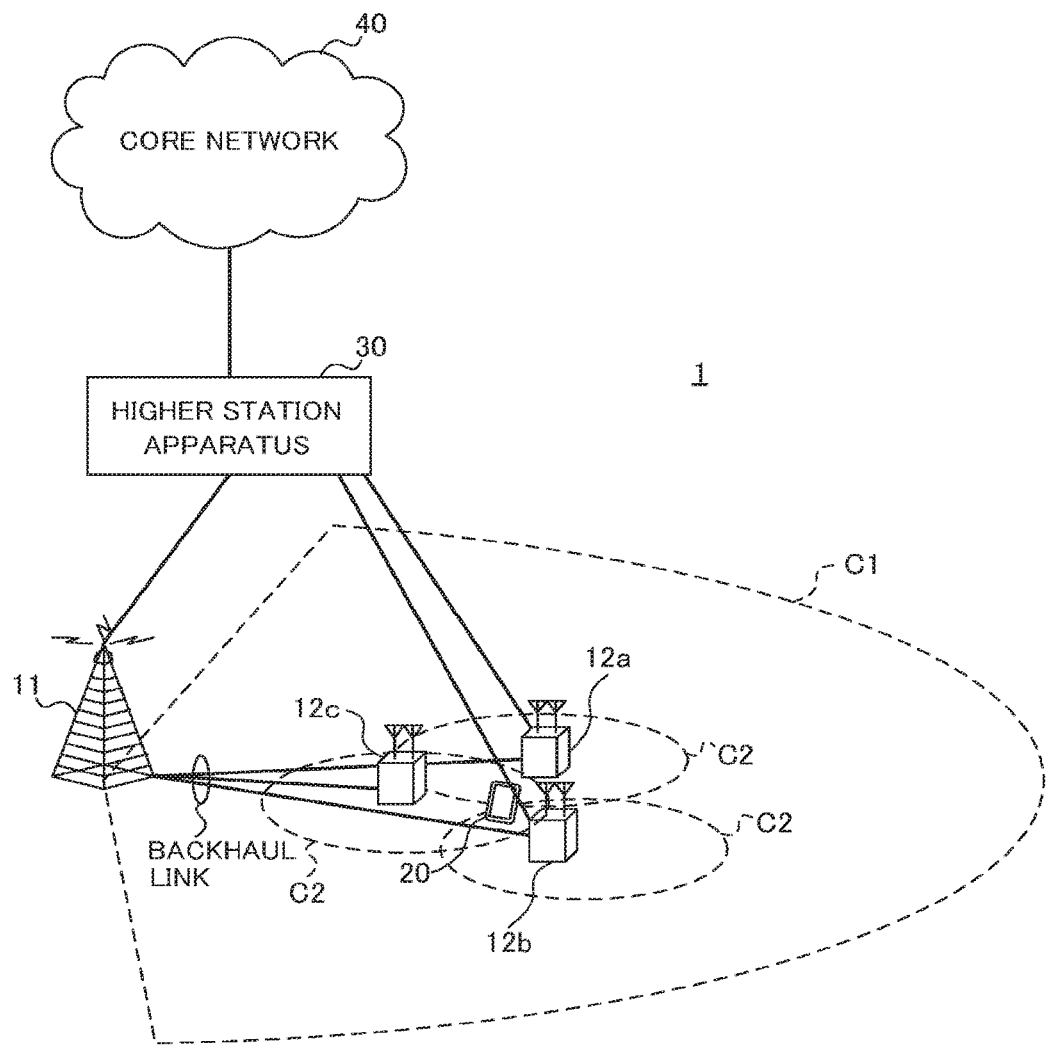
FIG. 13 is a diagram to show an example of a schematic structure of a radio communication system according to an embodiment of the present invention.

FIG. 13 is a schematic structure diagram to show an example of a radio communication system according to an embodiment of the present invention. As shown in FIG. 13, a radio communication system 1 is comprised of a plurality of radio base stations 10 (11 and 12), and a plurality of user terminals 20 that are present within cells formed by each radio base station 10 and that are configured to be capable of communicating with each radio base station 10. The radio base stations 10 are each connected with a higher station apparatus 30, and are connected to a core network 40 via the higher station apparatus 30.

In FIG. 13, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 13.

In the macro cell C1 and the small cells C2, the same frequency band may be used, or different frequency bands may be used. Also, the radio base stations 11 and 12 are connected with each other via an inter-base station interface (for example, optical fiber, the X2 interface, etc.).

Note that the macro base station 11 may be referred to as a "radio base station," an "eNodeB" (eNB), a "transmission point," and so on. The small base stations 12 may be referred to as "pico base stations," "femto base stations," "home eNodeBs" (HeNBs), "transmission points," "RRHs" (Remote Radio Heads) and so on.

The user terminals 20 are terminals to support various communication schemes such as LTE, LTE-A and so on, and may include both mobile communication terminals and stationary communication terminals. The user terminals 20 can communicate with other user terminals 20 via the radio base stations 10.

Note that the higher station apparatus 30 may be, for example, an access gateway apparatus, a radio network controller (RNC), a mobility management entity (MME) and so on, but is by no means limited to these. In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these. In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, synchronization signals, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

Figure 14:
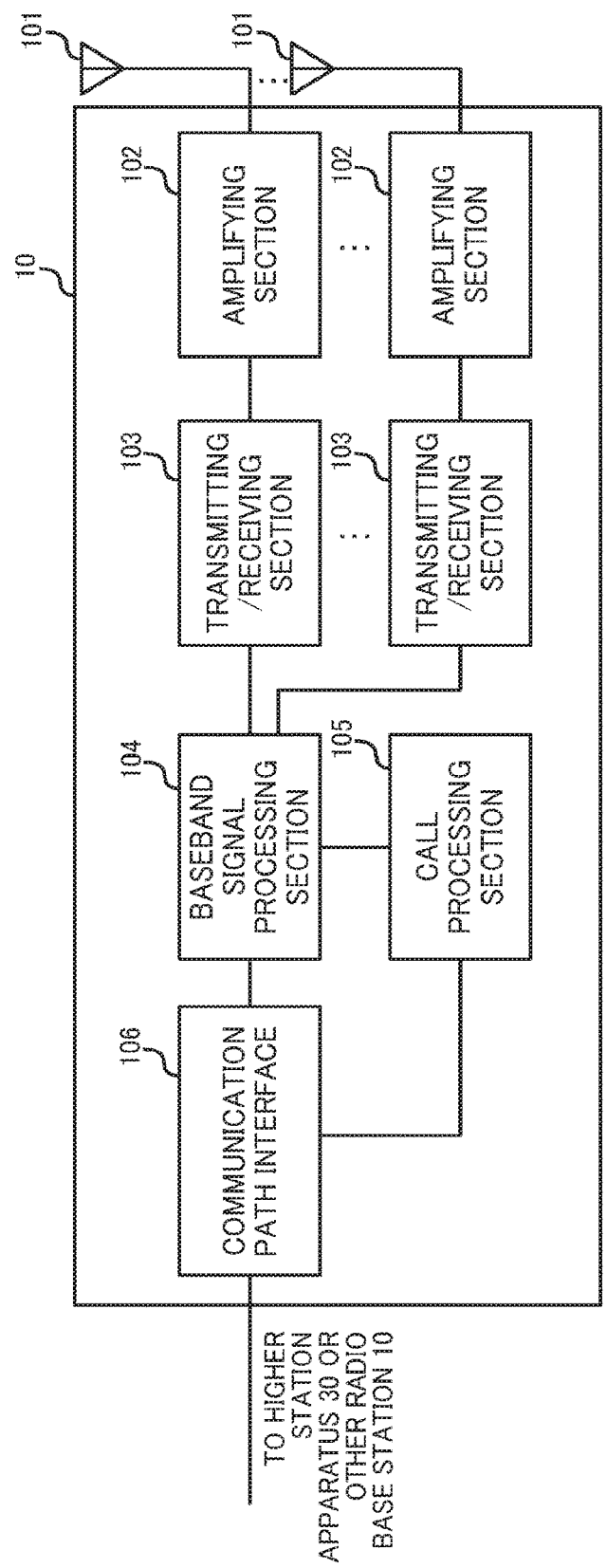
FIG. 14 is a diagram to show an example of an overall structure of a radio base station according to an embodiment of the present invention.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles (RA preambles) for establishing connections with cells are communicated. FIG. 14 is a diagram to show an overall structure of a radio base station 10 according to the present embodiment. The radio base station 10 (which may be either a radio base station 11 or 12) has a plurality of transmitting/receiving antennas 101 for MIMO communication, amplifying sections 102, transmitting/receiving sections 103, a baseband signal processing section 104, a call processing section 105 and a communication path interface 106. Note that the transmitting/receiving sections 103 are comprised of transmission sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received the transmitting/receiving antennas 101 are amplified in each amplifying section 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 transmits and receives signals to and from neighboring radio base stations 10 (backhaul signaling) via an inter-base station interface (for example, optical fiber, the X2 interface, etc.).

Figure 15:
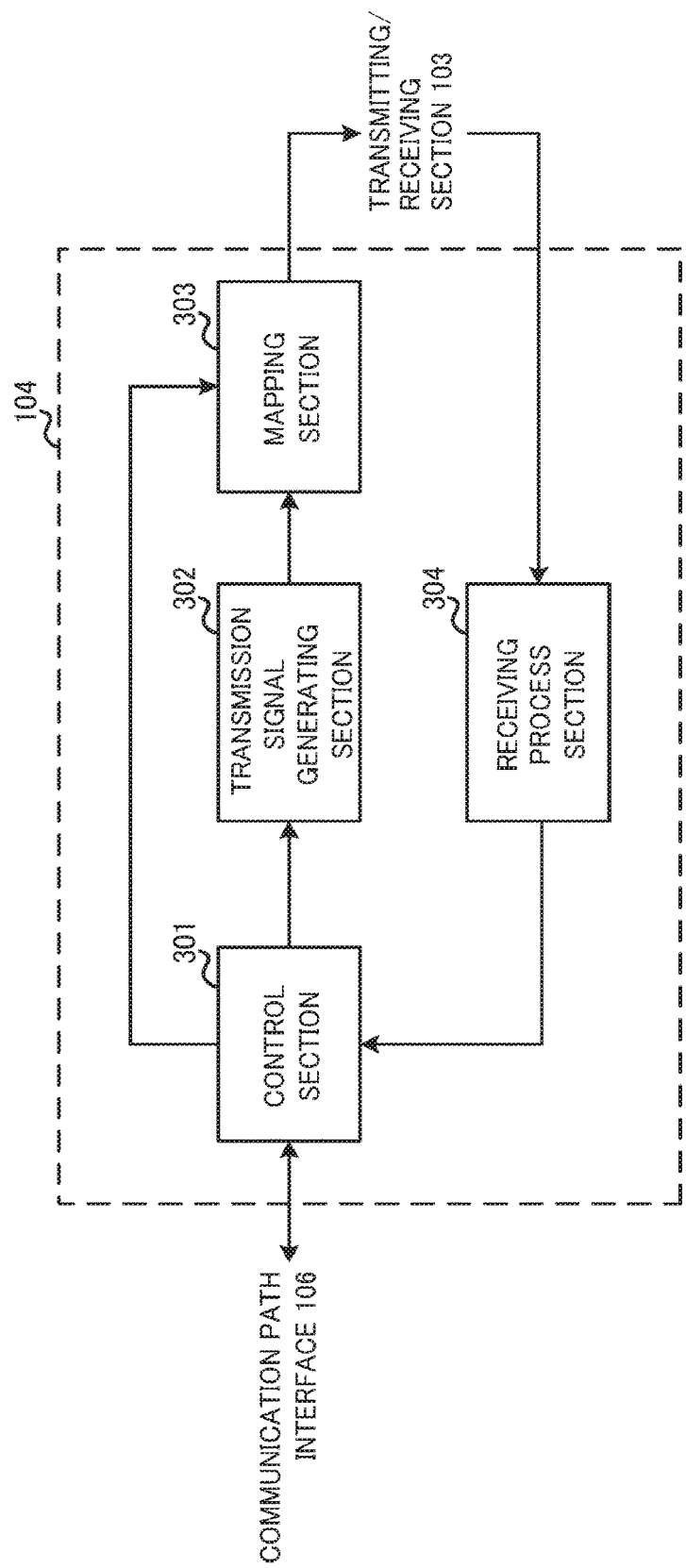
FIG. 15 is a diagram to show an example of a functional structure of a radio base station according to an embodiment of the present invention.

FIG. 15 is a diagram to show a principle functional structure of the baseband signal processing section 104 provided in the radio base station 10 according to the present embodiment. Note that, although FIG. 15 primarily shows functional blocks that pertain to characteristic parts of the present embodiment, the radio base station 10 has other functional blocks that are necessary for radio communication as well.

As shown in FIG. 15, the baseband signal processing section 104 provided in the radio base station 10 is comprised at least of a control section (scheduler) 301, a transmission signal generating section 302, a mapping section 303 and a receiving process section 304.

The control section 301 controls the scheduling of downlink data signals that are transmitted in the PDSCH, and downlink control signals that are communicated in the PDCCH and/or the enhanced PDCCH (EPDCCH). Also, the control section (scheduler) 301 controls the scheduling of downlink reference signals such as system information, synchronization signals, the CRS, the CSI-RS and so on. Furthermore, the control section 301 also controls the scheduling of uplink data signals that are transmitted in the PUSCH, uplink control signals that are transmitted in the PUCCH and/or the PUSCH, RA preambles that are transmitted in the PRACH, and so on. For the control section 301, a controller, a control circuit or a control device that can be described based on common understanding of the technical field to which the present invention pertains can be used.

The control section 301 can control the transmission signal generating section 302 and the mapping section 303 to process the random access procedure of the user terminal 20 adequately. For example, the control section 301 can apply control so that Msg0 is transmitted to the user terminal 20. Also, the control section 301 can apply control so that Msg2 is transmitted in response to an RA preamble.

Furthermore, the control section 301 can control the transmission signal generating section 302 and the mapping section 303 in order to adjust the uplink signal transmission power of the user terminals 20 connected with the radio base station 10. To be more specific, the control section 301 can command the transmission signal generating section 302 to generate transmission power control (TPC) commands for controlling the transmission power of uplink signals based on PHRs (Power Headroom Reports) and channel state information (CSI) reported from the user terminals 20, the uplink data error rate, the number of HARQ retransmissions, and so on, and control the mapping section 303 to include these TPC commands in downlink control information (DCI) and report this to the user terminals 20. By this means, the radio base station 10 can specify the uplink signal transmission power to request to the user terminals 20.

The transmission signal generating section 302 generates DL signals (downlink control signals, downlink data signals, downlink reference signals and so on) based on commands from the control section 301, and outputs these signals to the mapping section 303. For example, the transmission signal generating section 302 generates DL assignments, which report downlink signal allocation information, and UL grants, which report uplink signal allocation information, based on commands from the control section 301. Furthermore, the downlink data signals are subjected to a coding process and a modulation process based on coding rates and modulation schemes that are determined based on CSI from each user terminal 20 and so on. For the transmission signal generating section 302, a signal generator or a signal generating circuit that can be described based on common understanding of the technical field to which the present invention pertains can be used.

The mapping section 303 maps the downlink signals generated in the transmission signal generating section 302 to radio resources based on commands from the control section 301 and outputs these to the transmitting/receiving sections 103. For the mapping section 303, a mapping circuit or a mapper that can be described based on common understanding of the technical field to which the present invention pertains can be used.

The receiving process section 304 performs receiving processes (for example, demapping, demodulation, decoding and so on) of UL signals (uplink control signals, uplink data signals, uplink reference signals and so on) transmitted from the user terminal 20. Also, the receiving process section 304 may measure the received power (RSRP), channel states and so on by using the received signals. Note that the processing results and the measurement results may be output to the control section 301. For the receiving process section 304, a signal processor/measurer, or a signal processing circuit/measurement circuit that can be described based on common understanding of the technical field to which the present invention pertains can be used.

Figure 16:
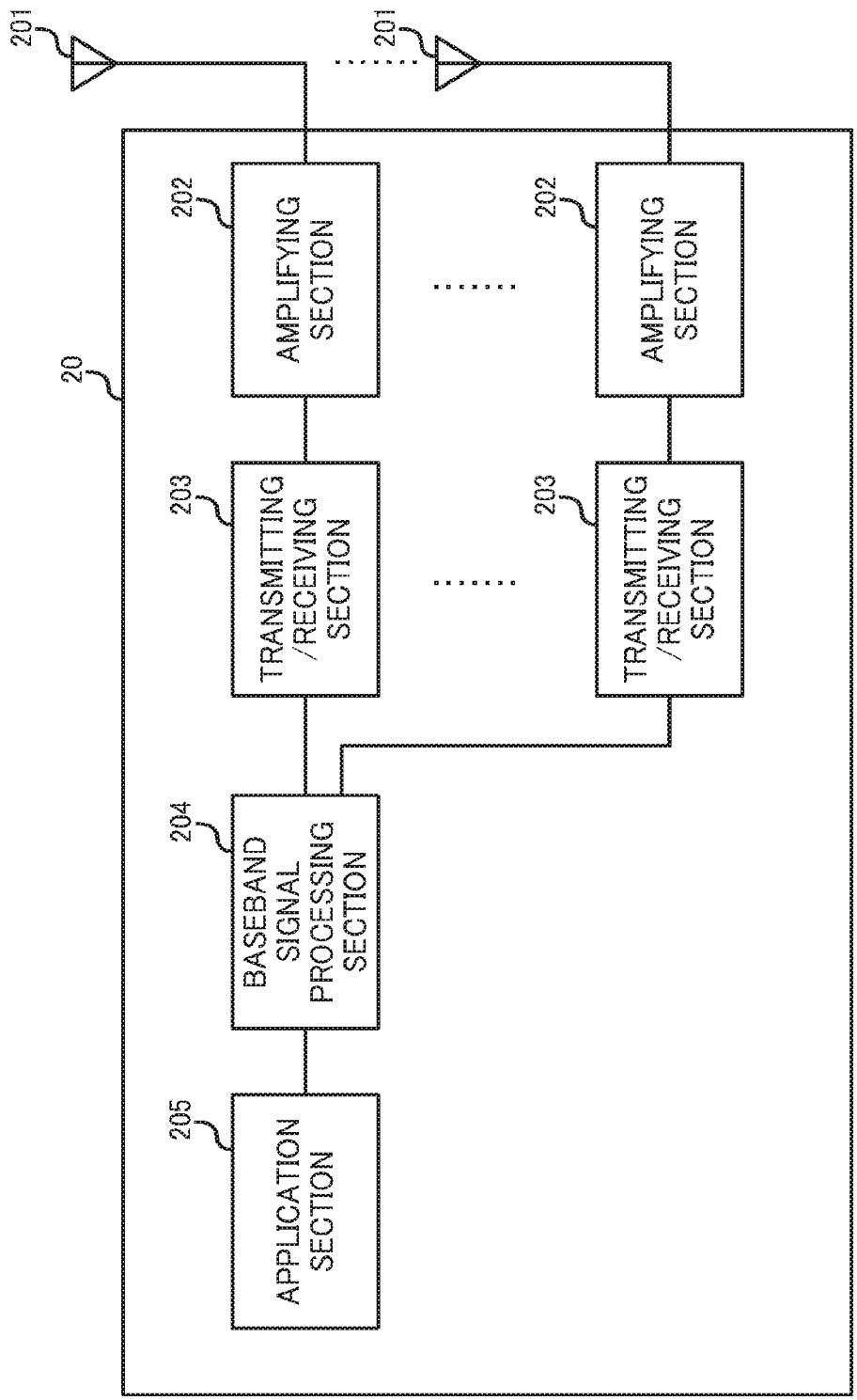
FIG. 16 is a diagram to show an example of an overall structure of a user terminal according to an embodiment of the present invention.

FIG. 16 is a diagram to show an overall structure of a user terminal 20 according to the present embodiment. As shown in FIG. 16, the user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmission sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204. For the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signals that are input are subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 can transmit and receive signals to and from a plurality of radio base stations that each configure a cell group (CG) comprised of one or more cells. For example, the transmitting/receiving sections 203 are capable of transmitting UL signals to a plurality of CGs at the same time.

Figure 17:
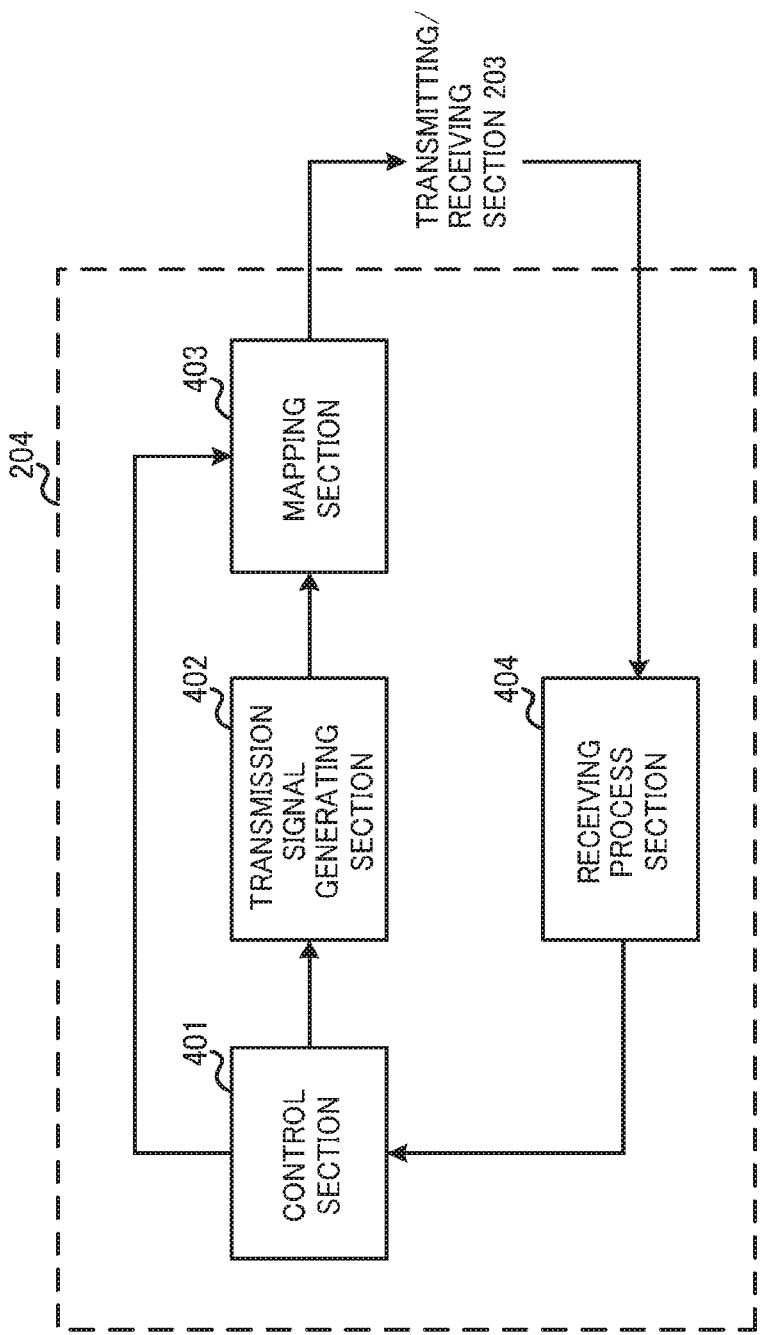
FIG. 17 is a diagram to show an example of a functional structure of a user terminal according to an embodiment of the present invention.

FIG. 17 is a diagram to show a principle functional structure of the baseband signal processing section 204 provided in the user terminal 20. Note that, although FIG. 17 primarily shows functional blocks that pertain to characteristic parts of the present embodiment, the user terminal 20 has other functional blocks that are necessary for radio communication as well.

As shown in FIG. 17, the baseband signal processing section 204 provided in the user terminal 20 is comprised at least of a control section 401, a transmission signal generating section 402, a mapping section 403 and a receiving process section 404.

The control section 401 acquires the downlink control signals (signals transmitted in the PDCCH/EPDCCH) and downlink data signals (signals transmitted in the PDSCH) transmitted from the radio base station 10, from the receiving process section 404. The control section 401 controls the generation of UL signals based on the downlink control signals, the results of deciding whether or not retransmission control is necessary for the downlink data signals, and so on. To be more specific, the control section 401 controls the transmission signal generating section 402 and the mapping section 403.

For the control section 401, a controller, a control circuit or a control device that can be described based on common understanding of the technical field to which the present invention pertains can be used.

Furthermore, the control section 401 controls the transmission power of UL signals. To be more specific, when the transmission sections 203 transmit PRACHs to the MCG and the SCG at the same time, the control section 401 controls the total of the transmission power of each PRACH to be equal to or lower than the maximum allowable transmission power ($P_{CMAX}$) by lowering the transmission power of the SCG PRACH (first to third embodiments). Here, control may be applied so that, not only the transmission power of the SCG PRACH, but also the transmission power of the MCG PRACH is lowered as well (second embodiment). Also, it is equally possible to execute control to make the transmission power of the SCG PRACH 0 by dropping (third embodiment).

Furthermore, the control section 401 applies power ramping when a PRACH is retransmitted, and increases the transmission power of the retransmitting PRACH. To be more specific, the level of ramp-up to use in power ramping may be determined based on the number of attempts to transmit the PRACH, the number of times simultaneous PRACH transmissions are attempted, the number of times solo PRACH transmissions are attempted, the maximum transmission power upon earlier PRACH transmissions, and so on.

Furthermore, when a RAR (Msg2) is acquired from the receiving process section 404, the control section 401 may apply control to determine the transmission power of and after Msg3 based on the latest PRACH transmission power that corresponds to this RAR.

The transmission signal generating section 402 generates UL signals based on commands from the control section 401 and outputs these signals to the mapping section 403. For example, the transmission signal generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is contained in a downlink control signal reported from the radio base station 10, the control section 401 commands the transmission signal generating section 402 to generate an uplink data signal. For the transmission signal generating section 402, a signal generator or a signal generating circuit that can be described based on common understanding of the technical field to which the present invention pertains can be used.

The mapping section 403 maps the uplink signals generated in the transmission signal generating section 402 to radio resources based on commands from the control section 401, and outputs these to the transmitting/receiving sections 203. For the mapping section 403, a mapping circuit or a mapper that can be described based on common understanding of the technical field to which the present invention pertains can be used.

The receiving process section 404 performs receiving processes (for example, demapping, demodulation, decoding and so on) of DL signals transmitted from the radio base station 10. Also, the receiving process section 404 may measure the received power (RSRP) and channel states by using the received signals. Note that the processing results and the measurement results may be output to the control section 401. For receiving process section 404, a signal processor or a signal processing circuit that can be described based on common understanding of the technical field to which the present invention pertains can be used.

Note that the block diagrams that have been used to describe the above embodiments show blocks in functional units. These functional blocks (components) may be implemented in arbitrary combinations of hardware and software. Also, means for implementing each functional block is not particularly limited. That is, each functional block may be implemented with one physically-integrated device, or may be implemented by connecting two physically separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and the user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and the user terminals 20 may include input devices such as input keys and output devices such as displays.

The functional structures of radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A user terminal comprising:
 a transmitter that transmits a Physical Random Access Channel (PRACH) in a first cell group (CG) and in a second CG; and
 a processor that controls transmission power of the PRACH of each CG,
 wherein, when retransmitting the PRACH of the second CG, the processor controls to perform power ramping based on a given count for power ramping of the PRACH of the second CG, and
  when dropping or reducing the transmission power of the PRACH of the second CG, the processor suspends incrementing the given count for power ramping of the PRACH of the second CG.

2. The user terminal according to claim 1, wherein, when total transmission power of PRACHs of the first CG and the second CG that are transmitted in an overlapping manner exceeds maximum possible transmission power, the processor controls the total transmission power not to exceed the maximum possible transmission power by dropping or reducing the transmission power of the PRACH of the second CG.

3. A radio communication method for a user terminal, comprising:
- transmitting a Physical Random Access Channel (PRACH) in a first cell group (CG) and in a second CG; and
- controlling transmission power of the PRACH of each CG,
- wherein, when retransmitting the PRACH of the second CG, the user terminal controls to perform power ramping based on a given count for power ramping of the PRACH of the second CG, and
- when dropping or reducing the transmission power of the PRACH of the second CG, the user terminal suspends incrementing the given count for power ramping of the PRACH of the second CG.

* * * * *